United States Patent [19]
Kalotay

[11] Patent Number: 5,379,649
[45] Date of Patent: Jan. 10, 1995

[54] CORIOLIS EFFECT METER USING OPTICAL FIBER SENSORS

[75] Inventor: Paul Z. Kalotay, Lafayette, Colo.

[73] Assignee: Micro Motion, Inc., Boulder, Colo.

[21] Appl. No.: 809,146

[22] Filed: Dec. 23, 1991

[51] Int. Cl.⁶ .............................................. G01F 1/84
[52] U.S. Cl. ................................... 73/861.38; 73/657
[58] Field of Search ............ 73/861.37, 861.38, 32 A, 73/653, 655, 657

[56] References Cited

U.S. PATENT DOCUMENTS

| Re. 31,450 | 11/1983 | Smith ............................. 73/861.38 |
| 4,275,296 | 6/1981 | Adelfsson . |
| 4,281,245 | 7/1981 | Brogardh et al. . |
| 4,358,678 | 11/1982 | Lawrence ........................... 250/227 |
| 4,407,561 | 10/1983 | Wysocki ............................ 350/96.3 |
| 4,418,984 | 12/1983 | Wysocki et al. .................. 350/96.33 |
| 4,724,316 | 2/1988 | Morton ............................... 250/227 |
| 4,843,890 | 7/1989 | Samson et al. .................... 73/861.38 |
| 5,038,620 | 8/1991 | Rogers, Jr. et al. ............. 73/861.38 |

FOREIGN PATENT DOCUMENTS 2071321 9/1981 United Kingdom .

OTHER PUBLICATIONS

Bruce Johnson, Dave Brodeur, Tom Lindsay and Randy Morton; "Macrobend fiber optic transducer for aerospace applications"; SPIE vol. 989 Fiber Optic Systems for Mobile Platforms II (1988); pp. 68–77.

Y. Ohtsuka, M. Kamaishi and Y. Imai; "Fibre-coil deformation-sensor immune from temperature disturbances"; International Journal of Optoelectronics, 1988, vol. 3, No. 5; pp. 371–380.

C. A. Wade and A. Dandridge; "An optical fiber flowmeter based on the Coriolis effect"; SPIE Voo. 985 Fiber Optic and Laser Sensors VI (1988); pp. 299–304.

Stewart D. Personick; "Fiber Optics Technology and Applications"; Aug. 1985; pp. 226–227.

D. A. Krohn; "Fiber Optic Sensors Fundamentals and Applications"; 1988; pp. 3, 32–35, 95–102.

Technical Staff of Newport Corporation; "Projects in Fiber Optics"; 1986; p. 77.

The 5th International Conference on Solid-State Sensors and Actuators & Eurosensors III; "Abstracts"; Jun. 25–30, 1989, Montreux, Switzerland; pp. 165 and 329.

Primary Examiner—Herbert Goldstein
Attorney, Agent, or Firm—Duft, Graziano & Forest

[57] ABSTRACT

A Coriolis mass flow rate meter for measuring the mass flow rate of material flowing through a conduit. The flow meter includes at least one flow tube through which the material to be measured passes. The flow tube is vibrated at its natural frequency so that the concurrent flow of material through the vibrating tube produces a displacement of the tube with the magnitude of the displacement being dependent upon the magnitude of the generated Coriolis forces and the mass flow rate of the measured material. The phase of the displacement of the flow tube is measured using optical fiber sensors comprising at least one loop of optical fiber which is flexed by the displacement of the flow tube. This flexing of the fiber causes a corresponding change in its optical conductivity and a corresponding change in the intensity of the light transmitted through the fiber from a light signal source to a signal detector. The modulated light signal received by the optical signal detector is converted to an electrical signal which is processed to generate the mass flow rate and other information for the flowing material. A feedback circuit for the light signal source monitors the average intensity of the light received by the signal detector and controls the drive signal applied to the light source to maintain the average intensity of the light signal received by the detector at a predetermined initial intensity.

23 Claims, 5 Drawing Sheets

CORIOLIS EFFECT METER USING OPTICAL FIBER SENSORS

FIELD OF THE INVENTION

This invention relates to structure comprising and a method of operating a vibrating tube Coriolis effect meter and, more particularly, to a Coriolis effect mass flow rate meter using optical fibers as displacement sensors.

PROBLEM—BACKGROUND OF THE INVENTION

Coriolis effect mass flow rate meters are well-known. One such meter that has gained widespread commercial acceptance is shown in U.S. Reissue Patent 31,450 to James E. Smith of Nov. 29, 1983. As taught by Smith, the flow of a material through an oscillating conduit produces Coriolis forces which are perpendicular to both the velocity of the mass moving through the conduit and the angular velocity vector of the oscillation of the conduit. The magnitude of the generated Coriolis forces is related to the material mass flow rate as a function of the angular velocity of the mass flowing through the conduit.

Coriolis effect flow meters typically use one or two flow tubes to direct the measured material flow from a pipe, through the meter tubes and then back to the pipe. These tubes may be either straight or curved, or irregular shaped, and they may be mounted in the flow line or attached to a substantially rigid support. The tubes are normally vibrated by an electromagnetic drive at the natural frequency of the tube structure including the measured material. The Coriolis forces resulting from the mass of the material flow through the vibrating tubes causes a displacement of portions of the tubes. The displacement is measured at points on the tubes by position or velocity sensors. The time differential $\Delta t$ between the movements of the tube elements at spaced apart locations is used for a determination of information including the mass flow rate of the measured material.

One step in measuring the generated Coriolis forces is to track the relative movement of different portions of the legs of meters having U-shaped tubes. This is typically done by attaching two electromagnetic velocity sensors each comprising a magnet and a pickup coil in opposing relative positions on the side legs of the flow conduit or conduits as described in U.S. Pat. No. 4,422,338 entitled, "Method and Apparatus for Mass Flow Measurements" and issued Dec. 27, 1983, to James E. Smith. This is also shown in U.S. Pat. No. 4,491,025 of Jan. 1, 1985, to James E. Smith and Donald R. Cage. In a parallel dual tube design as disclosed in the patent to Smith and Cage, a sensing coil is attached to one of the two flow conduits. A cooperating magnet mounted to the other flow conduit is positioned coaxially within the sensing coil. As the tube is vibrated by the drive coil, the sensing coil produces a signal which is representative of the movement of the conduit leg. By this means, a complete velocity profile is generated for each leg. The signals generated by the two sensors are applied to signal processing circuitry which produces an output representing the desired information for the flowing material (such as, for example, the mass flow rate, the density, etc).

Although the currently available Coriolis effect meters (including those disclosed in the above-identified patents) operate satisfactorily and produce excellent results under most conditions, there are certain circumstances in which their performance is not wholly satisfactory. For example, since they use electromagnetic devices as sensors, these devices can be affected by external magnetic fields. Under such circumstances their output data may be subject to error.

Electromagnetic sensors are also complex to manufacture due to the small gauge of the wire used in the sensing coils and due to the required resin coating and curing process for protecting the coils. Despite the resin coating, the sometimes harsh operating environment for these meters can cause the sensor coils to fail.

Another disadvantage is that the coils are inductive devices which store energy that can generate arcing. This is a problem if the meter is used in an explosive atmosphere.

Also, meters using these sensors are often used to measure the flow of material at high temperatures. These temperatures are often at such a level that the magnetic coils of these sensors have a high failure rate or else become unstable and generate output data that is unreliable.

In view of the above, it can be seen that there currently exists a need for Coriolis effect meters having sensors which are immune or resistant to harsh environmental conditions (such as, for example, strong electromagnetic fields or high temperatures). It can further be seen that there exists a need for sensors which are more economical to manufacture, are more reliable, are immune to explosion hazards, and are both mechanically and thermally rugged.

SUMMARY OF THE INVENTION

The present invention overcomes the foregoing disadvantages and achieves an advance in the art by providing sensing apparatus for a Coriolis effect meter that is rugged, that is highly reliable, that will not degrade over time, and that is better suited for use in harsh environmental conditions (such as high temperatures) and in strong electromagnetic fields or explosive atmospheres.

The invention comprises a Coriolis effect meter and, in particular, a Coriolis effect mass flow rate meter which uses one or more metal-clad optical fibers as flow tube displacement sensors. Preferably, the metal with which the optical fiber is coated is aluminum or gold. A specific application of the invention uses a pair of metal-clad optical fiber for a pair of sensors in which the microbend characteristic of the fibers is used to produce modulated optical signals corresponding to the displacement of the flow tubes. These modulated optical signals are produced when the displacement of the flow tube flexes the optical fiber sensor and attenuates its optical output signal by an amount that corresponds to the displacement of the flow tubes. An optical detector converts the modulated optical signals of the sensors into electrical signals which are processed to derive the mass flow rate of material through the flow tubes. The use of an outer metal coating on the fiber sensors protects the fibers from harsh environmental conditions and atmospheres.

The present invention provides a Coriolis effect meter having reliable displacement sensors which are unaffected by the presence of strong external electromagnetic fields and high temperatures. Optical fiber sensors are well-suited for use in explosive atmospheres since no sparks or arcing is generated by the fiber.

The use of optical fiber permits the sensors to be connected to light sources and cooperating optical detectors by means of closed optical fiber signal paths rather than copper conductors. This eliminates the problems associated with the transmission of small signals over copper conductors (such as, for example, ground loops interference, etc).

The light sources and the optical detectors are advantageously remotely situated, such as four feet, from the vibrating tube apparatus. This protects the light source and the optical detectors from the harsh environmental conditions, such as high temperatures or corrosive atmospheres, to which the vibrating tube apparatus may be subjected.

BRIEF DESCRIPTION OF THE DRAWING

The above and other advantages and features of the invention may be better understood from a reading of the following detailed description thereof taken in conjunction with the drawing in which.

DETAILED DESCRIPTION

Figure 1:
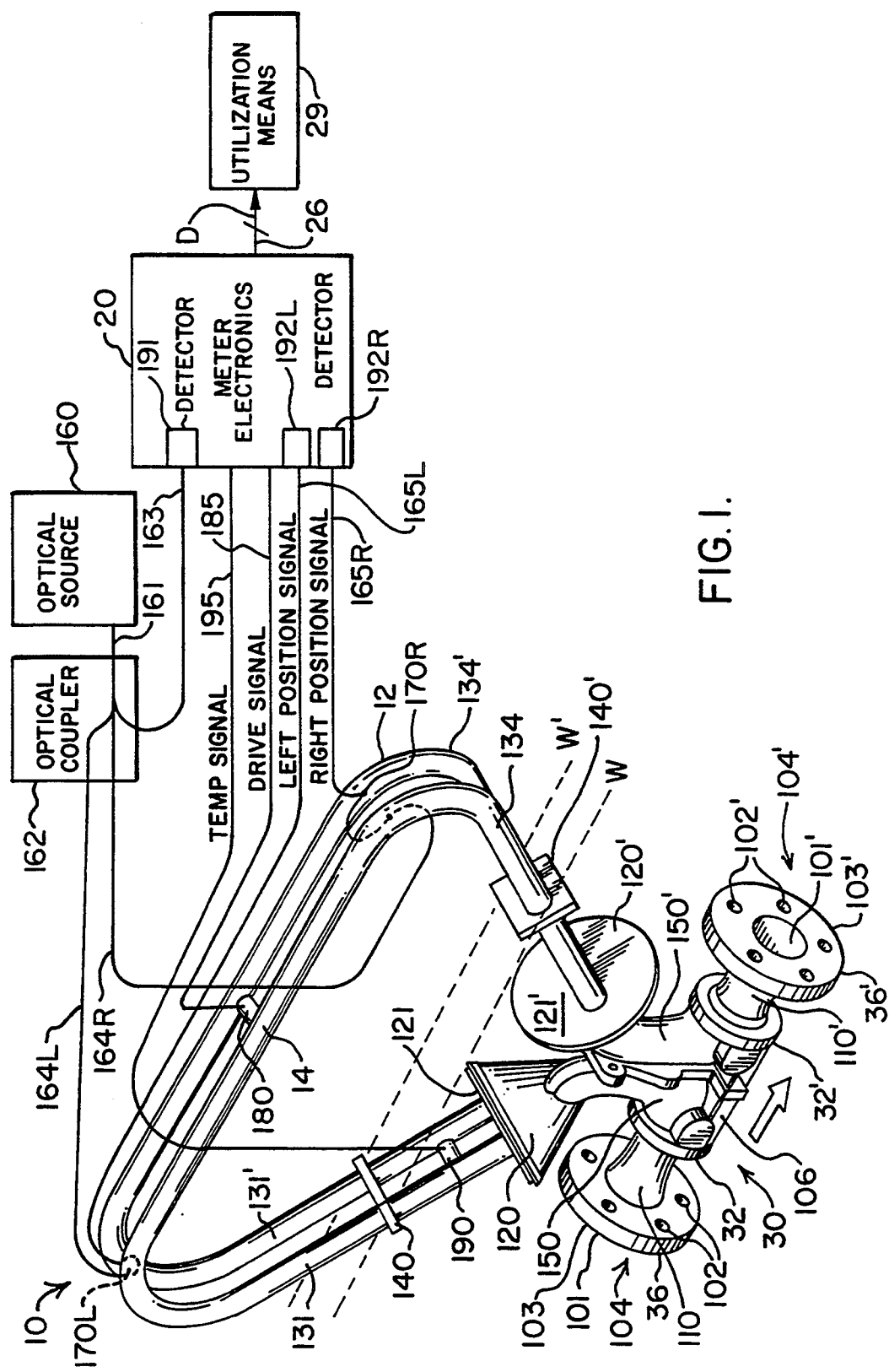
FIG. 1 discloses one possible exemplary embodiment of the invention.
Figure 5:
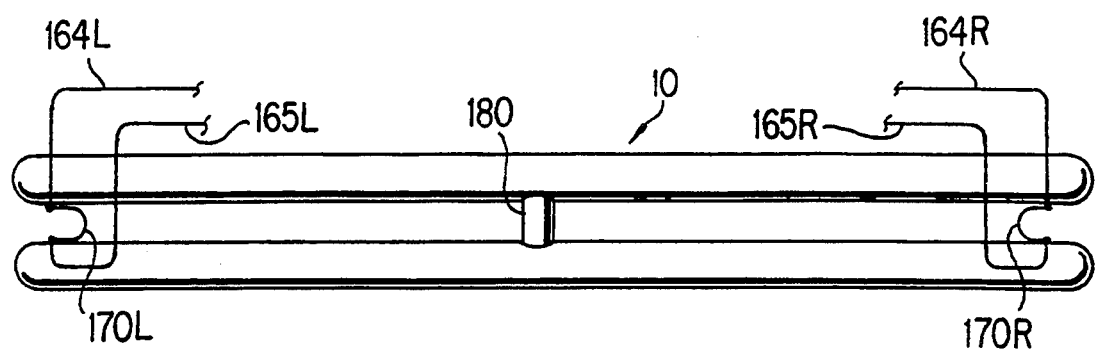
FIG. 5 is a top view of the embodiment shown in FIG. 1 on a smaller scale and with parts omitted for clarity.

Description of FIGS. 1 and 5

FIGS. 1 and 5 disclose a Coriolis effect mass flow meter 10 having flow tubes 12 and 14. Flow tubes 12 and 14 are selected and mounted to manifold body 30 so that they have substantially identical spring constants and moments of inertia about their respective bending axes W and W'. Flow tubes 12 and 14 have left side legs 131 and 131' and right side legs 134 and 134'. The side legs converge toward each other at manifold block elements 120 and 120'. Brace bars 140 and 140' serve to define the axes W and W' about which flow tubes 12 and 14 vibrate when a drive coil 180 is energized over path 185. Drive coil 180 is mounted at a midpoint region between the ends of flow tubes 12 and 14 to vibrate the flow tube structure about axes W and W' parallel to the direction of fluid flow in the upper portion of flow tubes 12 and 14.

Left optical sensor 170L and right optical sensor 170R are mounted near the respective ends of flow tubes 12 and 14 to sense the displacement of the end portion of flow tubes 12 and 14 caused by the combined action of the vibrations caused by drive coil 180 and the Coriolis motion caused by the flow of material through tubes 12 and 14. The mass of the left and right optical sensors 170L and 170R is preferably small relative to the mass of the corresponding flow tubes 12, 14 so as to minimize the impact of the optical sensors 170L and 170R on the vibration of the corresponding flow tube 12, 14. Temperature detector 190 is mounted onto one of the legs 131 or 131' of flow tubes 12 and 14 to measure the flow tube temperature caused by the temperature of the material therein. Temperature information is used to determine changes in the spring constant as well as other relevant information for the flow tubes and the measured material.

Flow tubes 12 and 14 are cantilever mounted by their side legs 131 and 134 to blocks 120 and 120' of manifold body 30 which is formed of castings 32 and 32'. Flow meter 10 is adapted to be attached to a supply conduit such as a pipeline (not shown) by flanges 36 and 36'. Manifold body 30 diverts the flow from the supply conduit into flow tubes 12 and 14 and then back to the supply conduit.

When meter 10 having flange 103 having holes 102 is connected via its inlet end 104 to an upstream conduit (not shown) carrying the material that is being measured, the material enters through an orifice 101 of inlet flange 103, flows through manifold elements 150 and block 120 of casting 32, to side legs 131 and 131' of flow tubes 14 and 12. From there, the material flows through the upper portion of flow tubes 12 and 14 and back down through side legs 134 and 134' to block 120' and elements 150' of manifold body 30. From there, the material flows through outlet end 104' which is connected by flange 103' to the downstream conduit (not shown).

The optical fiber sensors 170R and 170L are affixed to the right and left ends of flow tubes 12 and 14 so that the fiber element of each sensor bends or flexes as ends of tubes 12 and 14 are displaced with respect to each other. The optical fiber sensors 170R and 170L are preferably made of glass. The flexing of the fiber sensors 170L and 170R causes a change in the light attenuation characteristics of each fiber sensor. Each fiber sensor is energized by optical source 160, which may comprise a laser or a light emitting diode (LED). Optical source 160 applies its output to one end of fiber 161 that extends to optical coupler 162. The single fiber path 161 splits into three parts within coupler 162 with path 163 returning directly to detector 191 of meter electronics 20. The other two fiber paths extending from optical coupler 162 comprise the fiber path sections 164L and 164R. Fiber path section 164L extends to one end of fiber sensor 170L the output of which extends over fiber path 165L to detector 192L of meter electronics 20. Fiber path 164R extends to fiber sensor 170R the output of which extends over fiber path 165R to detector 192R of meter electronics 20.

The fiber sensors 170L and 170R may each comprise one or more loops of optical fiber which are affixed to each of tubes 12 and 14 so that the displacement of the tubes causes a corresponding displacement or bending of the fiber loop comprising each fiber sensor 170L and 170R.

It is well known that optical fibers possess what is known as "microbending" characteristics wherein their light transmission capability is greatest when the fiber is straight and devoid of bends. Conversely, it is also well known that a bending of an optical fiber reduces its light transmission capability by an amount dependent upon the degree of bending and that the amount of the reduction is repeatable to a very high degree of accuracy for small bends (termed "microbends"). Since the fiber comprising each fiber sensor 170L and 170R is bent or flexed by the displacement of flow tubes 12 and 14 with respect to each other, the optical transmission capability of each fiber sensor 170L and 170R is varied by the instantaneous displacement of flow tubes 12 and 14 caused by the generated Coriolis forces in combination with the driven vibration. This instantaneous flexing of the sensors causes a corresponding instantaneous variation in the light transmission capability of each sensor 170L and 170R. This results in an optical output signal being applied to each of fiber paths 165L and 165R that is modulated by the Coriolis displacement of the ends of flow tubes 12 and 14. The output of fiber paths 165L and 165R is applied to optical detectors 192L and 192R of meter electronics 20.

With the above arrangement, optical detectors 192L and 192R receive a modulated light signal whose instantaneous intensity is determined by the tube vibration amplitude and the instantaneous Coriolis displacement of the portion of tubes 12 and 14 to which optical sensors 170L and 170R are affixed.

The electrical output of optical detectors 192L and 192R is applied, as subsequently described, to the elements of meter electronics 20 which generate mass flow rate and other information pertaining to the material flowing through flow tubes 12 and 14. The output of temperature detector 190 is extended over metallic path 195 to meter electronics 20, which use this output information to provide the highest possible accuracy of generated material mass flow rate and other information. The output of meter electronics 20, representing the measured mass flow rate is applied over path 26 to utilization means 29—which may comprise either a display device, such as an indicator, or a plurality of indicators. Alternatively, utilization means 29 may comprise an industrial system whose process is controlled in whole or in part by the data applied over path 26.

It should be noted that the optical source 160 and detectors 192L and 192R are remotely situated, such as four feet, from the vibrating tube apparatus so as to isolate them from the harsh conditions, such as high temperatures and corrosive atmospheres, to which the vibrating tube apparatus may be subjected.

Figure 2:
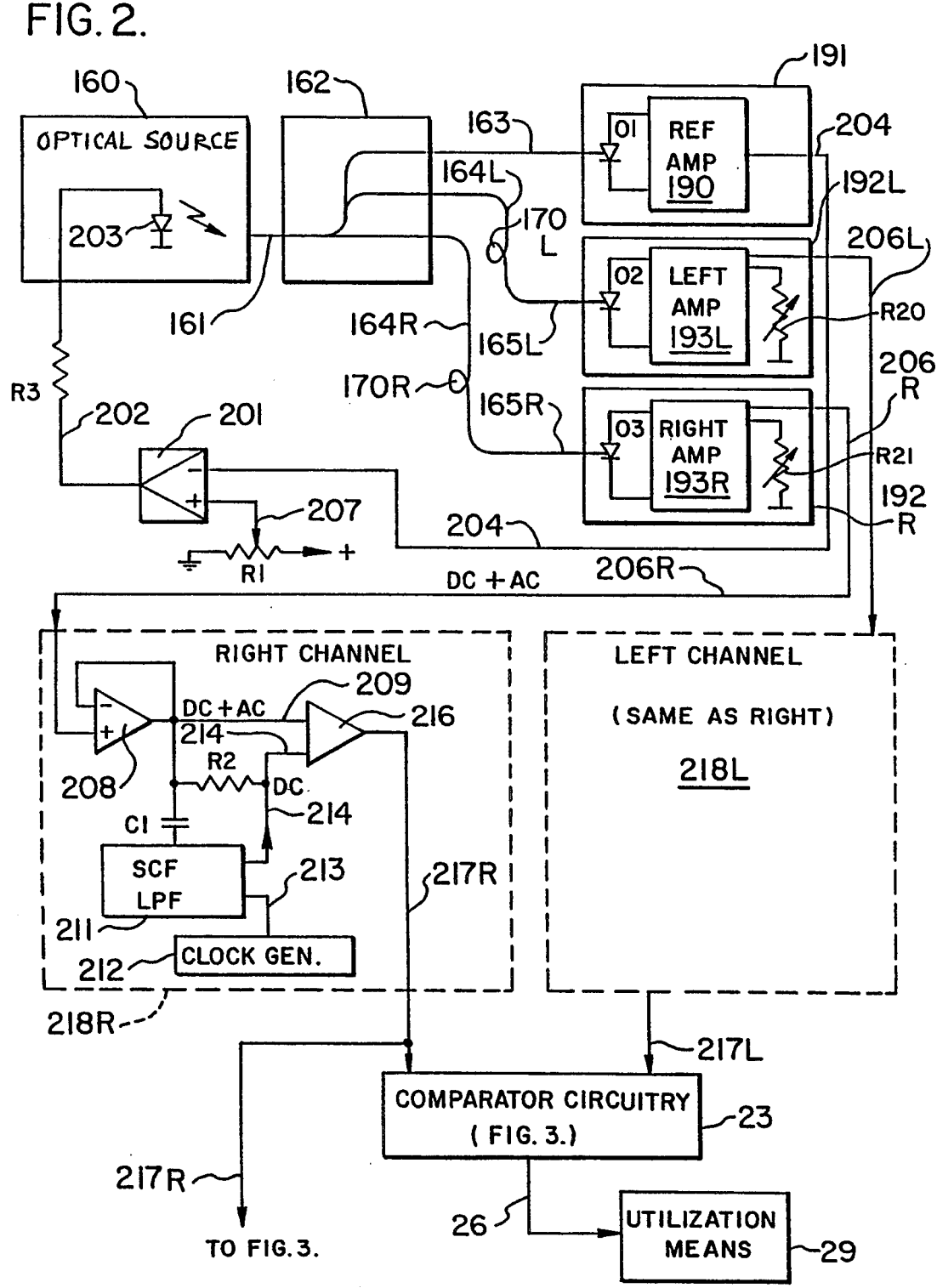
FIG. 2 discloses further details of the invention.

Description of FIG. 2

FIG. 2 discloses further details of the circuitry and apparatus comprising the presently preferred embodiment of the invention. Elements on FIG. 2 which are also shown on FIG. 1 are designated in the same manner as on FIG. 1. Elements on FIG. 2 which are not shown on FIG. 1 have a reference number in the 200 series.

Optical signal source 160 contains an LED or laser light source 203 which is energized by the potential on path 202 from the output of drive amplifier 201. The intensity of the optical output of source 203 is determined by the amplitude of the current on path 202.

The optical output of source 203 is received by the left end (FIG. 2) of fiber section 161 and is transmitted to optical coupler 162, where the single optical path 161 is split into the three optical paths 163, 164L and 164R. Fiber path 163 extends directly from coupler 162 to diode D1 of optical detector 191, which generates an electrical signal that is applied to the input of reference amplifier 190. The output of reference amplifier 190 is extended over path 204 to the upper input of the differential amplifier 201. The lower input of amplifier 201 receives a gain control signal over path 207 from potentiometer R1. Potentiometer R1 and amplifier 201 cause the potential applied over conductor 202 and resistor R3 to light source 203 to be constant in response to changes in the amplitude of the signal applied to path 204. The intensity of light generated by either an LED or a laser may decrease with time. Also the light conductivity of a fiber may decrease with time. If steps were not taken to compensate for this effect, it could cause the intensity of the steady state optical signals received by decoder D2 and D3 to decrease. This would cause erroneous signals to be generated by the remainder of the circuitry shown on FIG. 2.

Potentiometer R1 is adjusted so that potential 202 is set with a voltmeter to a level that causes source 203 to generate an optical signal whose intensity, when applied to optical detectors 191, 192L and 192R, causes a desired steady state voltage to be applied to paths 204, 206L and 206R. Subsequently, if the output from source 203 changes with age or temperature or from any other effect, output voltage 204 changes in a corresponding manner. This change is detected by differential amplifier 201, which alters its gain as required to cause the drive signal 202 to change by the amount required so that the intensity of light source 203 changes and the potential on conductor 204 returns to the level which was initially set by potentiometer R1. This feedback arrangement maintains the outputs 206R and 206L of the optical detectors 192R and 192L to be held constant in spite of any aging of source 203 or change in the optical conductivity of the fibers. This arrangement ensures that the accuracy of the output data generated by meter electronics 20 is not degraded. Potentiometers R20 and R21 control the gain of amplifiers 193L and 193R.

The output 206R of optical detector 192R is applied to the input of the right channel element 218R, and the output 206L of optical detector 192L is applied to the input of the left channel element 218L. Element 218L is identical to element 218R, whose details are fully disclosed. The signal 206R comprises an AC signal superimposed on a DC signal from the output of optical detector 192R. The amplitude of the DC component of the signal is substantially larger than that of the AC component. It is therefore necessary that the DC component be removed so that the AC component carrying the intelligence representing the flexing of fiber loop 170R can be accurately detected and processed.

Conductor 206R is applied to the lower input of buffer amplifier 208, whose output is applied over path 209 to the upper input of differential amplifier 216. Path 209 also extends to the junction of capacitor C1 and resistor R2. Capacitor C1, switched capacitor low pass filter 211 (SCF-LPF), resistor R2 and clock generator 212 operate so that, as clock generator 212 drives the low pass filter 211 over path 213, the output of the low pass filter on path 214 comprises a DC only signal that is applied to the lower input of differential amplifier 216. Other types of low pass filters could be used in place of the switched capacitor filter for element 211.

The upper input of differential amplifier 216 on path 209 comprises an AC signal superimposed on a DC signal having an amplitude equal to the DC signal on path 214. The equal DC signals on the upper and lower inputs of differential amplifier 216 cancel one another so that the differential amplifier 216 responds only to the received AC component of signal 209 on its upper input. This AC signal is amplified by differential amplifier 216 and applied over path 217R to the circuitry of FIG. 3. The phase of signal 217R is determined by the instantaneous flexing of fiber sensor 170R due to the displacement of the portion of flow tubes 12 and 14 associated with sensor 170R.

The left channel element 218L is identical to right channel element, and it receives signal 206L from the output of left optical detector 192L. It operates in the same manner to apply an output signal over path 217L to the comparator circuitry of FIG. 3. The phase of signal 217L represents the instantaneous displacement of the fiber loop sensor 170L determined by the instantaneous displacement of the portion of the flow tubes 12 and 14 associated with fiber sensor 170L.

Figure 3:
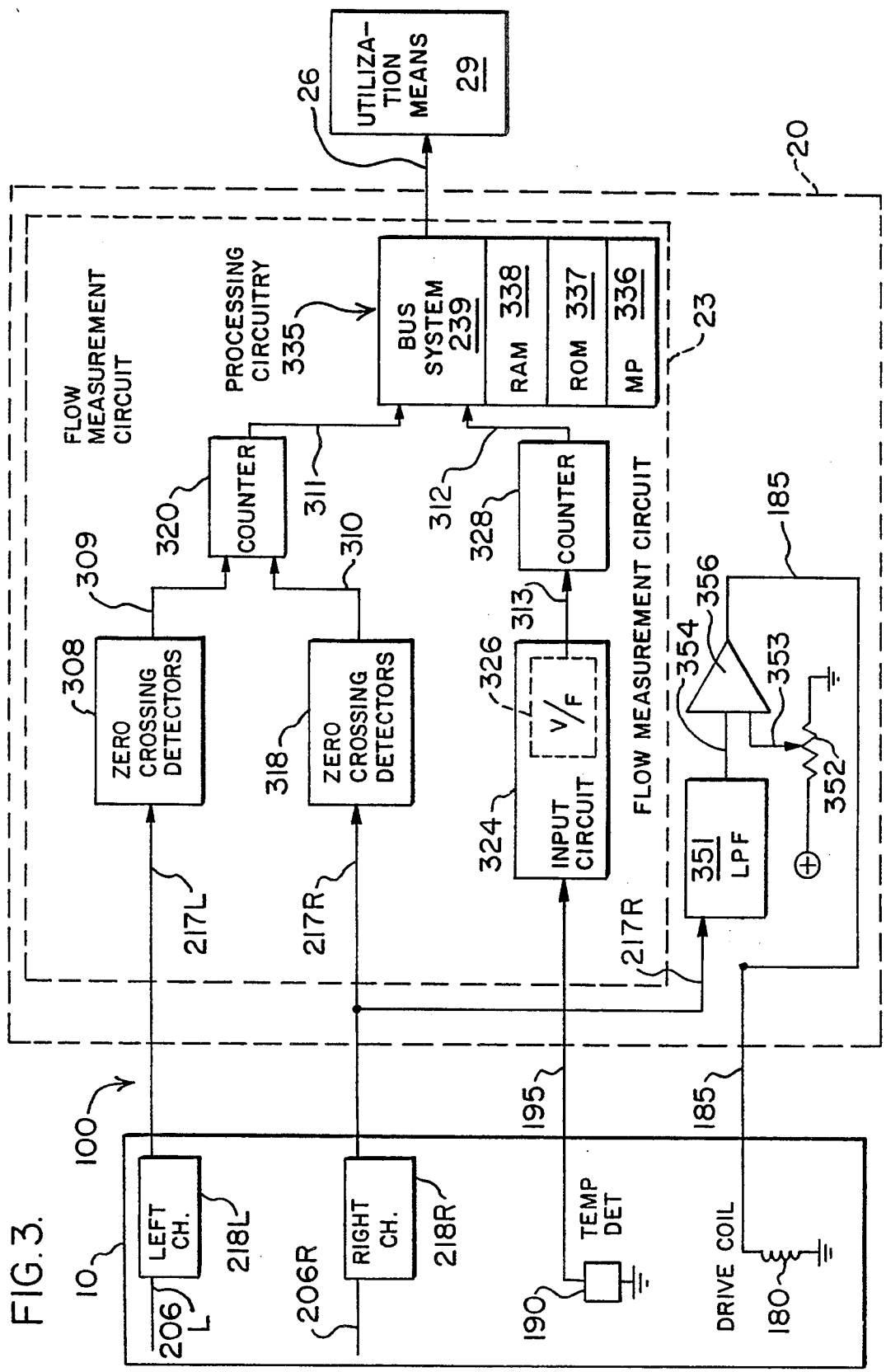
FIG. 3 discloses further details of the flow meter electronics.

Description of FIG. 3

FIG. 3 discloses the details of the circuitry 20 that receives the conditioned output of fiber detectors 192L and 192R on paths 217L and 217R and, in response thereto, generates output information, such as the mass flow rate, for the material flowing through the flow tubes 12 and 14. FIG. 3 also includes the circuitry that drives drive coil 180 to vibrate flow tubes 12 and 14 at their natural frequency.

The drive circuitry receives an input signal from the output 217R of the right channel amplifier 218R. This input is applied to the input of a low pass filter 351 whose output extends over path 354 to the upper input of the drive amplifier 356. The lower input of the drive amplifier 356 receives a control signal over path 353 from potentiometer 352. Potentiometer 352 is adjusted to cause the amplitude of the signal on path 185 to be of the level required to energize drive coil 180 so that it vibrates the flow tubes 12 and 14 at a desired amplitude to generate a useable signal in sensors 170L and 170R. This amplitude adjustment is made at the factory using precision adjustment techniques.

The signals 217L and 217R from the left and right channel amplifiers 218L and 218R, respectively, are applied to the inputs of the flow measurement circuitry 23 of FIG. 3. Flow measurement circuitry 23 includes processing circuitry 335 which processes the left and right position signals on leads 217L and 217R, respectively, along with the temperature signal on lead 195, in a well known manner (disclosed, for instance, in U.S. Pat. No. 4,843,890 of Jul. 4, 1989, to Allan L. Sampson and Michael J. Zolock) to calculate information including the mass flow rate of the material passing through Coriolis effect flow meter assembly 10. Output information is applied over path 26 to utilization means 29 which may be either a display or a process control system.

Inasmuch as the method by which flow measurement circuitry 23 generates information (including the mass flow rate) is well known to those skilled in the art, only that portion of electronics 20 that is germane to the present invention is discussed below.

Measurement circuit 23 contains two separate input channels: a left channel and a right channel. Each channel contains a zero crossing detector 308 or 318. The left and right displacement signals 217L and 217R are applied to respective zero crossing detectors (effectively comparators) 308 and 318, which generate level change signals whenever the corresponding position signal exceeds a voltage window defined by a small predefined positive and negative voltage level, e.g. ±2.5 V. The outputs 309 and 310 of zero crossing detectors 308 and 318 are fed as control signals to counter 320 to measure a timing interval, in terms of clock pulse counts, that occurs between corresponding changes in outputs 309 and 310. This interval is the $\Delta t$ value of sensors 170L and 170R and it varies with the mass flow rate of the material through tubes 12 and 14. This $\Delta t$ value, in counts, is applied in parallel as input data to processing circuitry 335.

Temperature detector element 190 is connected by path 195 to circuit 324. This circuit supplies a constant drive current to temperature detector element 190, linearizes the voltage that appears across the temperature detector element 190 and converts this voltage using voltage/frequency (V/F) converter 326 into a stream of pulses that has a scaled frequency which varies proportionally with any temperature changes detected by temperature sensor 190. The resulting pulse stream produced by circuit 324 is applied as an input to counter 328, which periodically counts the stream and produces a signal, in counts, that is proportional to the measured temperature. The output of counter 328 is applied as input data to processing circuit 335.

Processing circuit 335, which is advantageously a microprocessor based system, determines the mass flow rate from the digitized $\Delta t$ information and temperature values applied thereto. The digitized temperature value is used to modify a meter factor value based upon the temperature of the flow tubes. This compensates for changes in flow tube elasticity with temperature. The temperature compensated meter factor is then used to calculate the mass flow rate and volume flow rate from the measured $\Delta t$ value and calculated density value. Having determined the mass flow rate and the volume flow rate, circuitry 335 then updates the output signals applied over leads 26 to utilization means 29.

Processing circuitry 335 on FIG. 3 includes microprocessor 336 and memory elements including a ROM memory 337 and a RAM memory 338. The ROM 337 stores permanent information that is used by microprocessor 336 in performing its functions, while RAM memory 338 stores temporary information used by microprocessor 336. Microprocessor 336 together with its ROM 337 and RAM 338 memories and bus system 339 control the overall functions of the processing circuitry 335 so that it can receive signals from counters 320 and 328 and process them in the manner required to calculate and apply over path 26 to utilization means 29 the various items of data the Coriolis effect meter of the present invention generates. This information includes the mass flow rate and volume flow rate of the measured material.

The following describes in further detail how the processing circuitry 335 on FIG. 3 operates to compute the mass flow rate of the material flowing in flow tubes 12 through 14. The output of counter 320 represents the term $\Delta t$ which is the time difference between the time at which sensor 170R crosses a predetermined reference point as it is vibrated and twisted by forces and the time at which sensor 170L crosses a corresponding reference point. Counter 320 is started by one of the zero crossing detector outputs 309 or 310 and is stopped by the other output. This $\Delta t$ factor is multiplied by a calibration factor K which is dependent upon the material and geometry of the meter structure. K is empirically determined in a flow calibration facility and is input to microprocessor circuitry 335 at the factory in which the meter is constructed. This K is corrected for temperature during the operation of the flow meter under control of the output 312 of counter 328. The units of K are grams/seconds/microsecond. This means that for every microsecond of phase shift there will be a certain number of grams per second of mass flow rate. The mass flow rate is calculated by the processing circuitry 335 according to the formula MFR=$\Delta$tK, where MFR is the computed mass flow rate. To determine K for a given meter, fluid is run through the flow meter for a known amount of time and the fluid batch is weighed on a scale after passing through the flow meter. The microprocessor meanwhile integrates the $\Delta t$ (microseconds) during the batching operation. Knowing the weight of the fluid, the time of the batch, and the integrated Δt allows the calculation of K. U.S. Pat. No. 4,817,448 discloses microprocessor controlled circuitry that received Δt input information and generates mass flow rate output information.

Figure 4:
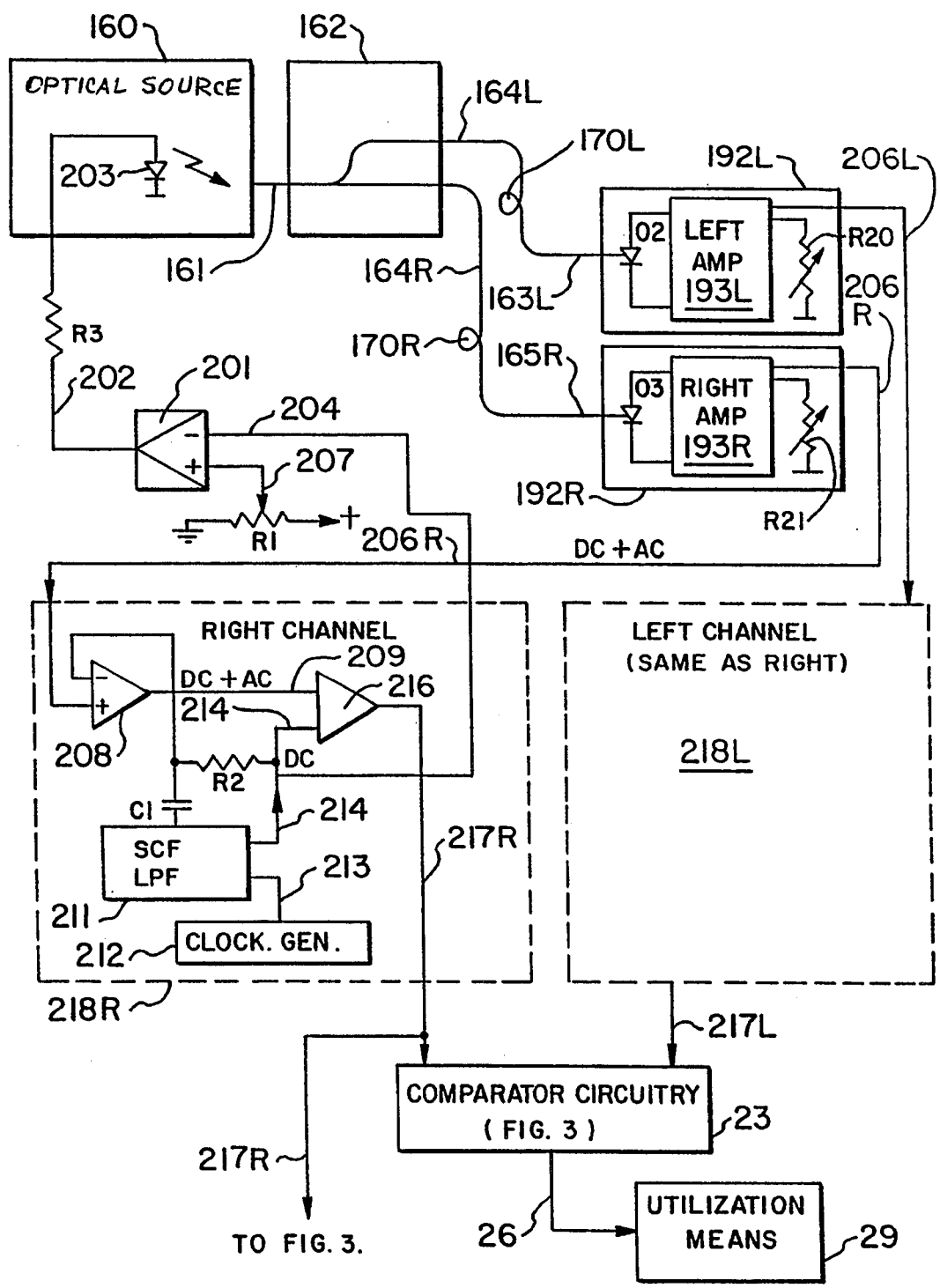
FIG. 4 discloses an alternative embodiment to that of FIG. 2.

Description of FIG. 4

FIG. 4 discloses an alternative embodiment of the invention that eliminates the need for the reference fiber 163 and the reference detector 191 of the embodiment of FIG. 2. On FIG. 2, the sole function of reference fiber 163 and reference detector 191 is to apply a DC signal to path 204 representing the intensity of the optical signal generated by light source 203 and applied over fiber path 163 to optical detector diode D1 of reference detector 191. On FIG. 2 this potential on path 204 is used as a control signal for feedback amplifier 201 so that it applies a drive signal on path 202 of the magnitude required to maintain the optical output signal of source 160 at a constant predetermined intensity at the input of optical diode D1. This feedback path compensates for changes in the intensity of the optical output of source 203 as well as changes in the optical conductivity of reference fiber 163. Since fibers 165L and 16DR are similar to reference fiber 163, this feedback circuit on FIG. 2 effectively maintains the average intensity of the light signals received by diodes D2 and D3 of optical detectors 192L and 192R at a constant value.

FIG. 4 is an alternative to the embodiment of FIG. 2 and does not require the reference fiber 163 or the reference detector 191. Instead, path 204 on FIG. 4 extends to the upper input of amplifier 201 and receives a DC feedback signal from path 214 and the output of the low pass filter 211. It has already been described in connection with FIG. 2 how the low pass filter 211 operates in conjunction with capacitor C1 and R2 so that path 214 of the low pass filter receives a DC signal equal to the value of the DC component of the composite DC and AC signal at output 209 of amplifier 208. The DC component of the signal 209, as previously explained, is determined by the intensity of the optical signal received by input diode D3 from optical fiber path 165R. The output 206R of the right channel detector 192R comprises a signal having a DC component and an AC component with the DC component representing the intensity of the optical signal received by diode D3 for a steady state condition of flow tubes 12 and 14. The DC signal on path 214 is equal to the magnitude of the DC portion of the signal on path 209, and is therefore also indicative of the intensity of the optical signal received by diode D3 over fiber path 165R. This DC signal on path 214 is applied over path 204 to the upper input of feedback amplifier 201 to control the magnitude of drive signal 202 and, in turn, the intensity of the light output from source 203 so that the optical signals received by diodes D2 and D3 of optical detectors 192L and 192R remain at a constant average intensity in spite of changes due to aging of light source 203 and fibers 165L and 165R.

Caveat

While a specific embodiment of this invention has been disclosed, it is expected that those skilled in the art can and will design alternate embodiments of this invention that fall within the scope of the appended claims. For instance, while FIG. 1 discloses the use of a meter having dual flow tubes of substantially U-shaped configuration, it is to be understood that the present invention is not so limited and may be used with other flow tube structures. For example, it is known in the art to use straight tube Coriolis effect meters, and the invention may be easily adapted for use with such meter structure. One portion of an essentially straight tube can be associated with a driver to vibrate a section of the tube at the natural frequency of the tube section and the material flowing therein. In such an arrangement, a pair of sensors may be associated with other portions of the tube to provide a straight tube Coriolis effect meter operating on the Δt principle taught by the Smith U.S. Pat. No. RE 31,450.

Also, the present invention is not limited to use for Coriolis effect meters operating on the Δt principle and may be used with any of the known signal processing schemes used for producing mass flow rate information from a coriolis mass flow rate meter. For example, the phase detection and signal processing techniques shown in U.S. Pat. No. 4,711,132 of Dec. 8, 1987, to Erik B. Dahlin and U.S. Pat. No. 4,914,956 of Apr. 10, 1990, to Alan M. Young and E. Ronald Blake may be employed, if desired.

If desired, the present invention is equally useful in connection with Coriolis effect flow tube meters having only one sensor device. In such an arrangement, the Δt signal processing principle is not used. Instead, a single optical fiber sensor positioned at a straight flow tube's harmonic node may be used to provide information representing the instantaneous displacement or position of the flow tube harmonic node associated with the single optical fiber sensor. This instantaneous position of the single sensor is indicative of the magnitude of the generated Coriolis forces and, in turn, the magnitude of the mass flow rate of the material through the tube.

The position output information generated by the single optical fiber sensor may be used with appropriate signal processing circuitry to generate information representative of the material flowing through the tube such as mass flow rate. In such a single sensor embodiment, the zero crossing detectors 308 and 318 and counter 320 of FIG. 3 are replaced by an analog-to-digital (A/D) converter having an input connected to path 217L and a digital output connected to path 311 representing the flexing of a single optical. fiber sensor (i.e., 170L). The digital output signal on path 311 representing the sensor displacement is applied to processing circuitry 335 and may be processed in a conventional manner by processing circuitry 335 to generate the mass flow rate information for the measured material.

In accordance with this alternative embodiment for a single fiber sensor, the signal processing circuitry 335 determines the mass flow rate for the measured material by multiplying the digital output of the A/D converter on path 311 representing the instantaneous magnitude of the Coriolis displacement of the flow tube by a system constant K which is input to the signal processing circuitry 335 at the factory when the meter is fabricated. If desired, a pair of position sensors, each positioned at a harmonic node of a straight vibrating flow tube, may be used to generate displacement information in a similar manner. Each sensor would then apply its output to its own A/D converter whose digital output would be applied to signal processing circuitry 335.

This specification, including the description and claims, utilizes the term "substantially U-shaped" to characterize the shape of flow tubes 12 and 14 together with their side legs 134 and 131. This term also characterizes structures shown in the aforementioned prior art patents, such as the patent to Smith and the patent to Smith and Cage, which show flow tube meter structure having a configuration that more nearly approximates a "U" than does the modified "U" structure shown on FIG. 1 of the present invention. Nevertheless, by the term "substantially U-shaped," it is to be understood that this term includes the present structure shown on FIG. 1 as well as structures, other than straight, including those that more nearly approximate the letter "U". It is therefore to be understood that the principles of the present invention may be used with any flow tube geometry in which a flow tube displacement measurement is employed.

I claim:

1. A Coriolis mass flowmeter for measuring the mass flow rate of material through a conduit, said flow meter comprising:
   (a) at least one flow tube having an inlet and an outlet;
   (b) means for coupling said at least one flow tube when in use, with a conduit to provide flow of material through said at least one flow tube from said inlet to said outlet;
   (c) means for vibrating said at least one flow tube so that the vibration of said at least one flow tube and the flow of material through said at least one flow tube together produce a resultant oscillation of said at least one flow tube; and
   (d) optical fiber means that, in use, bend in response to said oscillation of said at least one flow tube for optically measuring said oscillation of said at least one flow tube to provide for measurement of the mass flow rate through the conduit, wherein said optical fiber means comprises at least one optical fiber capable of providing optical attenuation in response to microbending of said at least one optical fiber.

2. A flowmeter according to claim 1 wherein said at least one optical fiber comprises metal-coated glass.

3. A flowmeter according to claim 1 wherein said at least one flow tube is substantially in the shape of a U.

4. A flowmeter according to claim 3 wherein said at least one flow tube comprises two flow tubes.

5. A flowmeter according to claim 3 wherein:
   (a) said at least one flow tube includes two legs and a curved portion extending therebetween; and
   (b) said at least one optical fiber is coupled to at least one flow tube.

6. A flowmeter according to claim 5 wherein:
   (a) said at least one flow tube comprises first and second flow tubes; and
   (b) said at least one optical fiber is connected between a portion of said first flow tube and a portion of said second flow tube.

7. A flowmeter according to claim 6 wherein said optical fiber means comprises:
   (a) said at least one optical fiber having an input end, an output end, and a loop portion;
   (b) signal source means coupled to said input end of said at least one optical fiber for introducing an optical signal into said at least one optical rider;
   (c) detector means for measuring said optical signal at said output end of said at least one optical fiber; and
   (d) means for determining the modulation due to said microbending of said optical signal at said output end of said at least one optical fiber to provide a measure of the oscillation of said first and second flow tubes.

8. A flowmeter according to claim 7 wherein said loop portion forms a single loop.

9. A flowmeter according to claim 7 wherein said loop portion comprises a plurality of loops.

10. A flowmeter according to claim 7 wherein said at least one optical fiber comprises metal-coated glass.

11. A flowmeter according to claim 1 wherein said optical fiber means comprises:
    (a) said at least one optical fiber having an input end, an output end, and a loop portion coupled to said at least one flow tube;
    (b) signal source means coupled to the said end of said at least one optical fiber for introducing an optical signal into said at least one optical fiber;
    (c) detector means for measuring the optical signal at said output end of said at least one of optical fiber; and
    (d) means for determining the modulation due to said microbending of said optical signal at said output end of said at least one optical fiber to provide a measure of the oscillation of said at least one flow tube.

12. A flowmeter according to claim 11 wherein the mass of said loop portion of said at least one optical fiber is small relative to the mass of said at least one flow tube.

13. A flowmeter according to claim 11 wherein said loop portion forms a single loop.

14. A flowmeter according to claim 11 wherein said loop portion comprises a plurality of loops.

15. A flowmeter according to claim 11 wherein said at least one optical fiber comprises metal-coated glass.

16. A flow meter according to claim 11 wherein said metal comprises aluminum or gold.

17. A method for measuring the mass flow rate of material through a conduit, said method comprising the steps of:
    (a) providing at least one flow tube having an inlet and an outlet adapted so that, in use, said at least one flow tube can be coupled to a conduit to provide flow of material through said at least one flow tube from said inlet to said outlet;
    (b) vibrating said at least one flow tube so that the vibration of said at least one flow tube and the flow of material through said at least one flow tube together produce a resultant oscillation of said at least one flow tube;
    (c) optically measuring the oscillation of said at least one flow tube using the microbending-induced optical attenuation of an optical fiber means; and
    (d) determining the mass flow rate of material through said conduit based on the measured oscillation of said at least one flow tube.

18. A method according to claim 17 wherein:
    (a) said optical fiber means includes at least one optical fiber having an input end, an output end, and a loop portion;
    (b) said optical fiber means being coupled to said at least one flow tube; and
    (c) the step of optically measuring said oscillation of said at least one flow tube comprises the steps of:
       (i) introducing an optical signal into said input end of said at least one optical fiber;
       (ii) measuring said optical signal at said output end of said at least one optical fiber;
       (iii) determining the modulation due to said microbending of said optical signal at said output end of said at least one optical fiber; and (iv) the mass flow rate of material flowing through said conduit being determined from said modulation of said optical signal.

19. A method according to claim 18 wherein said at least one flow tube is substantially in the shape of a U.

20. A method according to claim 19 wherein said at least one flow tube means comprises first and second flow tubes through which the material is flowed.

21. A method according to claim 20 wherein:

(a) said first and second flow tubes each have first and second legs and a curved portion extending therebetween and (b) said optical fiber means comprises first and second optical fibers coupled between said first flow tube and said second flow tube.

22. A method according to claim 17 wherein said optical fiber means is metal-coated glass.

23. A method according to claim 18 wherein said optical fiber means is metal-coated glass.

* * * * *